Figure 1:
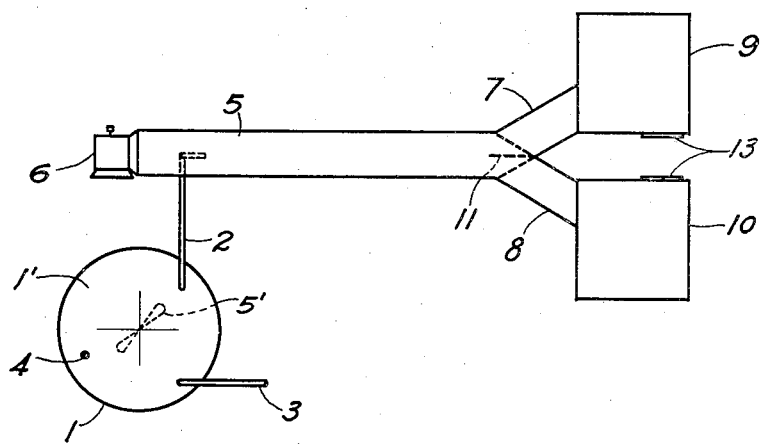

UNITED STATES PATENT OFFICE.

WALTER B. MURPHY AND WILBUR G. DUNNING, OF PHILADELPHIA, PENNSYLVANIA, ASSIGNORS TO THE BARRETT COMPANY, A CORPORATION OF NEW JERSEY.

SUBLIMATION OF HYDROCARBONS.

1,409,897. Specification of Letters Patent. Patented Mar. 14, 1922.

Application filed April 1, 1920. Serial No. 370,586.

*To all whom it may concern:*

Be it known that we, WALTER B. MURPHY and WILBUR G. DUNNING, citizens of the United States, residing at Philadelphia, in the county of Philadelphia and State of Pennsylvania, have invented certain new and useful Improvements in Sublimation of Hydrocarbons, of which the following is a specification.

It is well known that anthracene and carbazol may be separated, and that anthracene may be purified from carbazol, by the sublimation of anthracene and carbazol mixtures from molten caustic potash. It is also well known that anthracene, carbazol and phenanthrene may be purified by sublimation.

It has been the practice heretofore in sublimation processes to pass the vapors from the subliming vessel into a large cooling chamber and here condense them; or, the separation of the compounds is effected by passing the vapors, after sublimation, into a series of separate chambers maintained at predetermined temperatures. As each of the several compounds in the vapor mixture has a definite saturation or precipitation temperature, the temperatures in the chambers are so regulated that the compound with the highest saturation temperature is collected in the first chamber, the temperature of which is held just below the saturation temperature of this particular compound. The next succeeding chamber is maintained at a temperature just below that at which the compound having the next lower saturation temperature will condense out, and so on. A fairly pure product is thus collected from each of the various chambers.

In both of the processes as heretofore practiced the sublimed products contain considerable quantities of large crystals resulting from slow condensation of the vapors at high temperatures. In many cases these large crystals are very objectionable, because for uniform results in the chemical processes for which these compounds serve as crudes, it is very desirable that the crystals be very small and of uniform size.

We have found that if, in the sublimation of the above hydrocarbons,—namely, anthracene, carbazol and phenanthrene—the vaporization is accomplished in a current of air, considerable decomposition of the hydrocarbons occurs at the temperature of sublimation. This decomposition results in the loss of valuable material.

Purification of anthracene, carbazol and phenanthrene by sublimation in a current of steam has been described and has been practiced in the arts. The use of steam eliminates to a large degree the losses due to decomposition. However, the products produced by steam sublimation have been very unsatisfactory because, in addition to the formation of large crystals, previously mentioned, the water formed by condensation of the steam has been collected with the condensed anthracene, phenanthrene and carbazol, forming a wet mass, difficult and expensive to handle and ship.

We have found that the decomposition of the hydrocarbons incident to sublimation in a current of air, the presence of a large amount of water incident to sublimation in a current of steam, and the formation of large crystals incident to slow condensation at high temperatures, in the previously described and heretofore practiced precedures, may be avoided by effecting the sublimation of the hydrocarbons,—namely, anthracene, phenanthrene and carbazol—in a current of steam, and subsequently mixing and diluting the mixture of steam and hydrocarbon vapor, after it leaves the subliming vessel, with an amount of air sufficient to rapidly condense all of the hydrocarbons, and to give a final gas mixture of such composition that the major portion of the steam will remain in the vapor form at the temperature of the collecting chamber.

In practicing this invention we prefer to pass the current of steam into the subliming vessel containing the molten hydrocarbons. The mixture of hydrocarbon vapor and steam may be diluted with a sufficient volume of air immediately after leaving the subliming vessel, and previous to introduction into the collecting chamber, and the mixture of air, steam and suspended particles of condensed hydrocarbons may then be passed to the collecting chamber where the hydrocarbons are allowed to settle out. The gases pass out of the chamber substantially free from hydrocarbons. The amount of air used in diluting the vapors from the subliming vessel should preferably be sufficient to practically instantaneously and totally condense substantially the entire amount of the hydrocarbons, thus producing extremely small and uniform crystals; to retain substantially all of the steam in the form of water vapor in the exit air from the collecting chamber; and to permit only minimum amounts of steam to condense out as water with the hydrocarbons. If climatic conditions necessitate it, we may dry the air before use with refrigeration, by use of calcium chloride, or by any other of the well known methods, and, if necessary, we may maintain the temperature in the collecting chamber slightly above atmospheric temperature to avoid precipitation of water vapor.

The invention will be understood from the description in connection with the accompanying drawings, in which—

Figure 2:
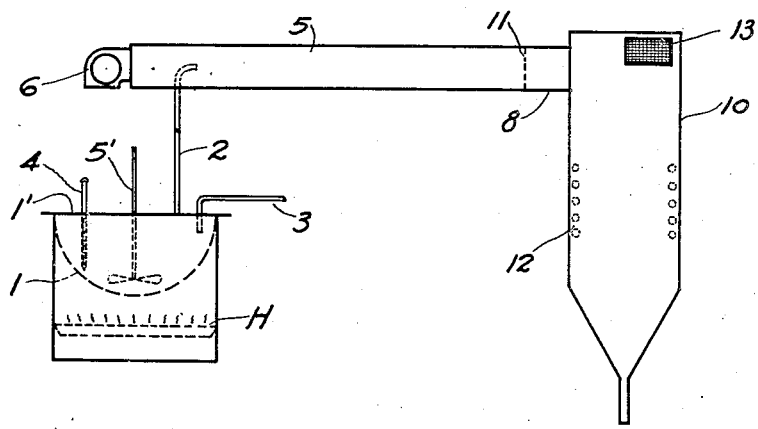

Fig. 1 is a plan view showing somewhat diagrammatically an arrangement of apparatus for carrying out the process, and Fig. 2 is a side elevation of the same.

In the drawings, reference character 1 represents a subliming vessel which may be heated by any convenient means as, for example, by the gas heater H. The vessel 1 is closed by means of an air-tight cover 1', from which leads an outlet pipe 2, and through which extends an inlet pipe 3 for steam. A thermometer 4 may be inserted through the cover 1', and a stirrer 5' may be provided as shown for the purpose of agitating the contents, when desired.

The outlet pipe 2 leads into a duct 5, which duct is provided at one end with a fan 6 for blowing air through the same. The duct 5 leads by means of branches 7 and 8 into two chambers 9 and 10. A hinged vane 11 is provided for the purpose of alternately closing the branches 7 and 8, thereby leaving an open passage-way into the other branch from the duct 5.

The chambers 9 and 10 may be provided with heating means 12, and conically shaped hopper bottoms for ease in discharging the products, and openings covered with wire screens or cloth 13 are provided in said chambers for the escape of gases.

The operation of the apparatus will be specifically described in connection with the purification of anthracene, though it is to be understood that the invention is not restricted to this particular hydrocarbon. Anthracene is introduced into the subliming vessel 1, where it is melted and its temperature maintained at about 270° C. during the sublimation process, by means of the heater H. Steam is led into the subliming vessel 1 through the pipe 3, and may be introduced below the melted anthracene or may be blown across the surface of the same, whereupon the mixture of steam and anthracene vapors pass out through the outlet pipe, and enters the duct 5. Satisfactory results have been obtained by supplying about $\frac{8}{10}$ths of a pound of steam per pound of anthracene to be sublimed at about 100 pounds gauge pressure and allowing the steam to expand in the subliming vessel to substantially atmospheric pressure. Under these conditions, the mixture of steam and anthracene vapors leaving through the outlet pipe 2 will be at a temperature from about 220° C. to about 250° C., and will be picked up by the current of air entering the duct 5 from the fan 6. The anthracene appears to be instantly and completely precipitated as an extremely fine powder which is swept by the air through the duct into one of the collecting chambers 9 or 10. The air and steam or uncondensed products escape through the wire or cloth screens 13, while the solid products collect in the bottom of the chamber, and can be removed when desired. It has been found that approximately 500 cu. ft. of air per pound of anthracene sublimed is convenient, though this quantity of air may be varied within somewhat wide limits, depending upon the temperature and humidity of the air. The temperature of the mixed vapors and solids following the condensation, varies from about 20° C. to about 100° C., more or less, depending upon the humidity and temperature of the entering air. The collecting chambers 9 and 10 may be maintained by means of the heaters 12 at temperatures which will prevent precipitation of the water vapor but will permit condensation of the anthracene. That is, the air upon meeting the steam of steam and anthracene vapors becomes supersaturated with the anthracene vapors thus causing the anthracene to condense while the steam causes only a partial saturation of the air and is carried out with the air as it passes out through the screens 13.

It frequently happens that impure anthracene contains materials some of which are more volatile than the anthracene and others which are less volatile than the anthracene. Therefore, as the sublimation begins, the anthracene vapors are badly contaminated with the more volatile materials, thus making it advisable to divert this portion of the sublimates into one of the chambers, and after most of these products have been sublimed, the purer anthracene is diverted into the other chamber by proper manipulation of the vane 11, and continues to be collected therein until the sublimation of the anthracene is near completion, whereupon the vapors then become contaminated with the less volatile products, thereby rendering it desirable for these impure materials to be diverted into the collecting chamber with the first vapors. In this manner, a substantially pure fraction of anthracene may be collected in one of the chambers while a less pure fraction is collected in the other chamber. The residue in the subliming vessel 1 at the end of the sublimation of a batch of anthracene may be removed in the ordinary way, and a new supply introduced into the vessel 1 to be sublimed.

It is obvious that the details in this process may be varied considerably without departing from the spirit or scope of the invention, and that many other materials besides anthracene may be purified by this sublimation process.

While the described process is especially useful in the last step of the purification of hydrocarbons such as anthracene, phenanthrene, and carbazol, which have been previously partially purified by previously employed methods, it is also suitable for separating these hydrocarbons from each other to a certain extent.

We claim:

1. The process of purifying hydrocarbons that are capable of being sublimed, which comprises subliming the hydrocarbon by means of steam and then diluting the vapors with a sufficient amount of air to cause the hydrocarbon to condense.

2. The process of purifying hydrocarbons that are capable of being sublimed, which comprises subliming the hydrocarbon by means of steam and then diluting the vapors with air.

3. The process of purifying hydrocarbons that are capable of being sublimed, which comprises subliming the hydrocarbon by means of steam and then diluting the vapors with dry air at a temperature such that no appreciable amount of water vapor will be precipitated.

4. The process of purifying hydrocarbons, which comprises subliming the hydrocarbon by means of steam and then diluting the vapors with a sufficient amount of air to cause substantially all of the hydrocarbon to condense suddenly.

5. In the process of purifying aromatic hydrocarbons, the step which comprises introducing air into a stream of steam carrying vapors of said hydrocarbons.

6. In the process of purifying anthracene, the step which comprises introducing air into a stream of steam carrying vapors of anthracene at an approximate range of temperature from 220° C. to 250° C.

In testimony whereof we affix our signatures.

WALTER B. MURPHY.
WILBUR G. DUNNING.